Patented Aug. 29, 1933

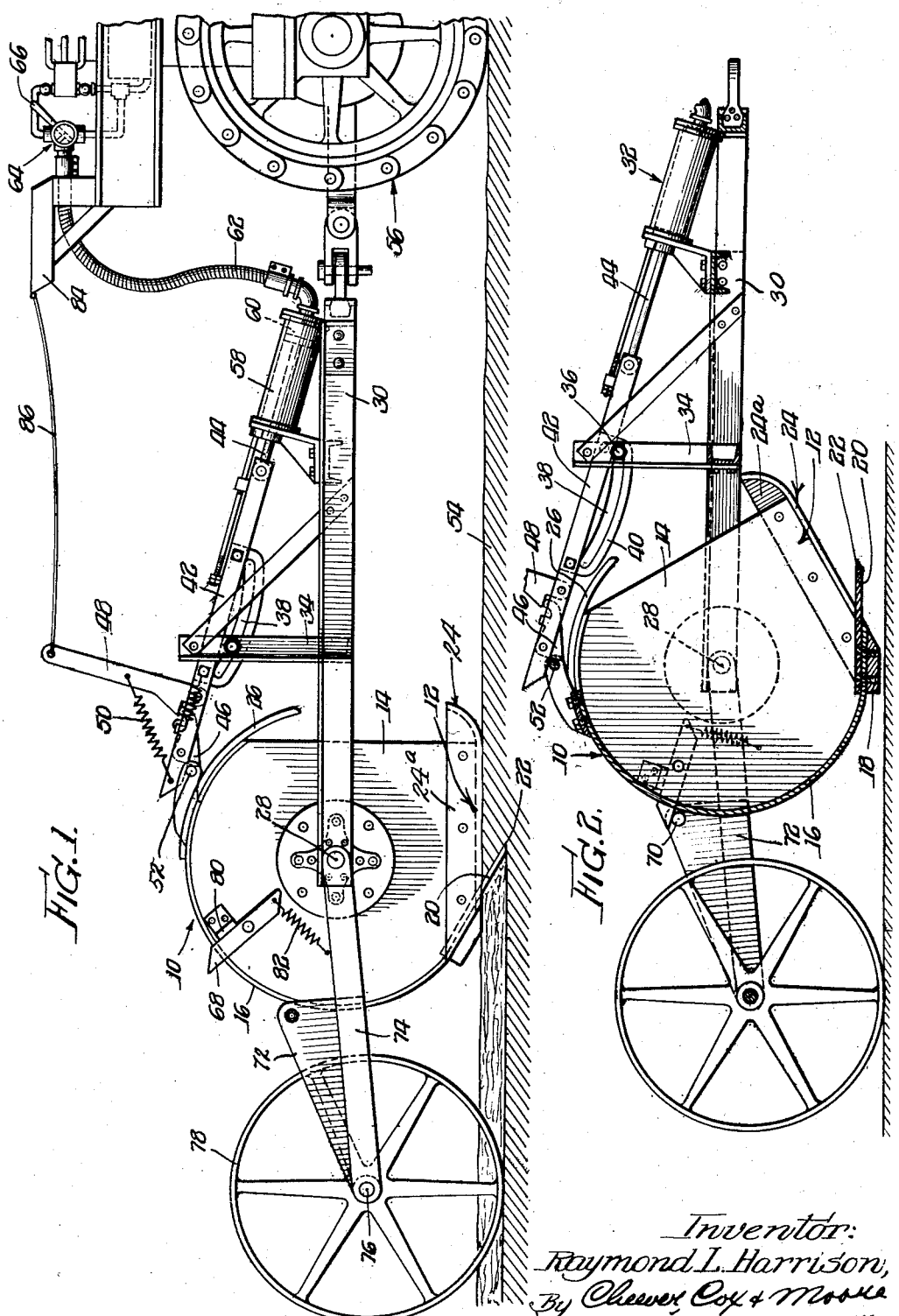

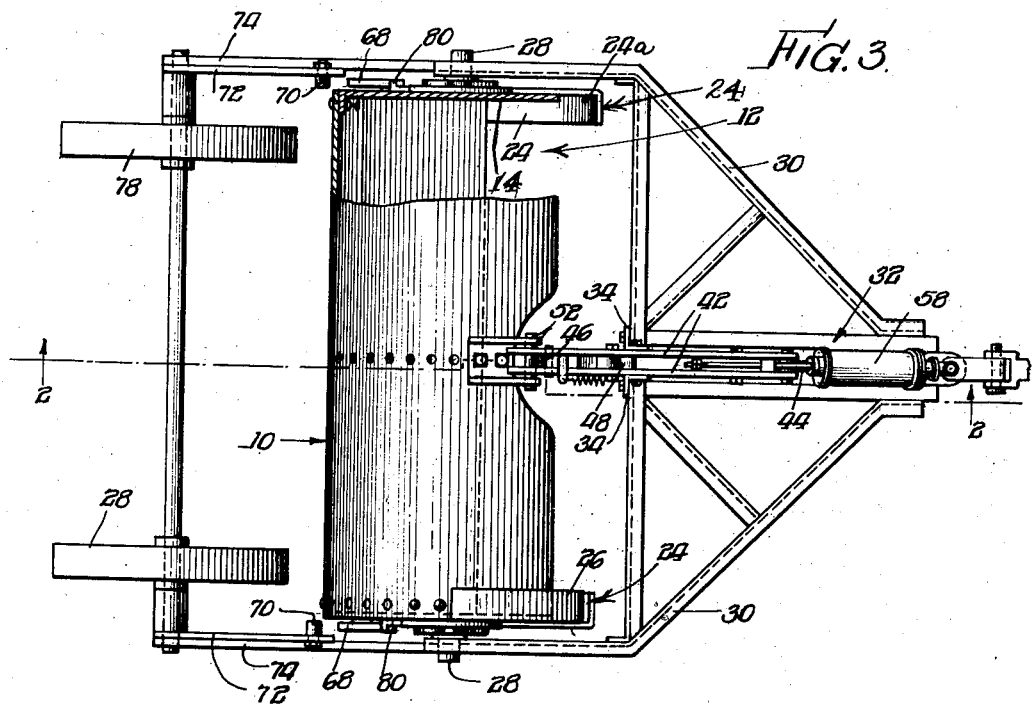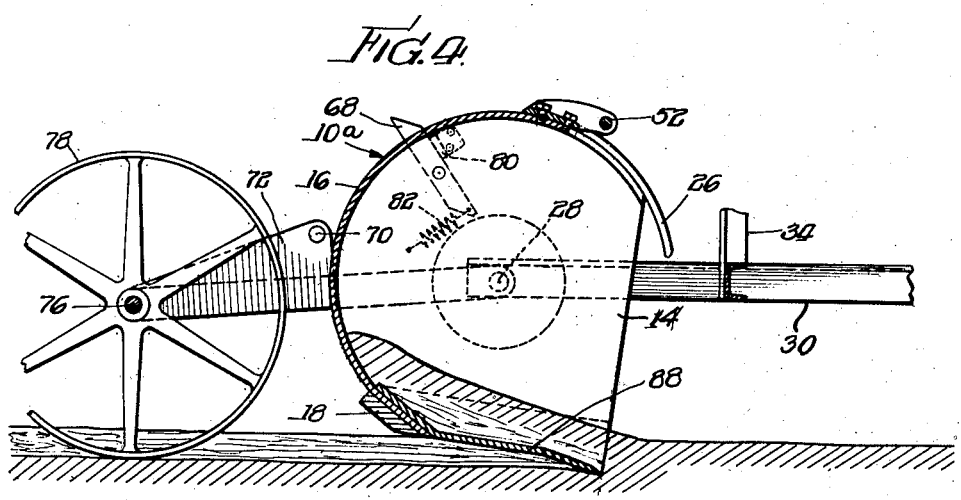

1,924,359

UNITED STATES PATENT OFFICE 1,924,359

ROLL-OVER SCRAPER

Raymond L. Harrison, Albuquerque, N. Mex.

Application April 11, 1931. Serial No. 529,378

10 Claims. (Cl. 37—140)

My invention relates generally to earth working or moving apparatus, and particularly to apparatus of the type which employs tiltable scrapers or bowls for shifting earth from one position to another.

It is one of the primary objects of my invention to provide a scraper or earth carrying device of the tiltable bowl type which is equipped with improved bowl tilting mechanism.

Another object of my invention is to provide, in combination with the improved bowl tilting mechanism, hydraulic means for controlling the shifting of the bowl to vary the position of the cutting edge thereof.

Still another object of my invention is to provide a scraper or earth carrying device, as above set forth, in which improved practical mechanism is provided for effecting the automatic elevation of the bowl, and to this end I propose to equip the bowl with novel means for engaging abutments to effect the upward shifting of the bowl.

More specifically, my invention contemplates, in combination with a tiltable bowl as above set forth, a trailer adapted to be drawn behind the bowl, said trailer resting upon the portion of the soil which is acted upon by the bowl and not that portion of the soil positioned on opposite sides of said bowl.

Still more specifically, it is an object of my invention to provide a trailer as above set forth including rotary tractive means such as wheels which are adapted to be drawn behind the bowl between the planes of the opposite ends thereof, said rotary tractive means being connected with the draft frame which is connected with the bowl.

A further object of my invention is to equip an earth moving device of the type set forth above with a hydraulic mechanism including a piston and a cylinder shiftable therein, said hydraulic mechanism being inclined from the horizontal so as to render the functioning of the tiltable bowl more effective.

A still further object of my invention is to provide a hydraulically operable scraper or bowl of the "bottomless type".

The foregoing and numerous other objects and advantages will be more apparent from the following detailed description when considered in connection with the accompanying drawings, wherein—

Figure 1 is a side elevational view of an earth working or shifting mechanism coupled with a fragmentary portion of a tractor, said mecha- nism being representative of one embodiment of my invention;

Figure 2 is a fragmentary view taken substantially along the line 2—2 of Figure 3, the bowl or scraper being shown in its rearwardly tilted and elevated position;

Figure 3 is a plan view of the device shown in Figure 1; and

Figure 4 discloses a modified bowl or scraper device equipped with bowl elevating mechanism similar to that disclosed in Figures 1 to 3 inclusive.

Referring now to the drawings more in detail wherein like numerals have been employed to designate similar parts throughout the various figures, it will be observed that one embodiment of my invention includes a tiltable scraper or bowl which I have designated generally by the numeral 10 in Figures 1 to 3 inclusive. The term "bowl" is used in the specification not by way of limitation but because this term is commonly employed in the trade to designate an earth carrying means of the pivotally supported type, or what is commonly referred to as the "roll-over" type bowl or scraper. In other words, the term "bowl" includes various types of earth carrying means, scoops, shovels, scrapers, and the like.

This bowl 10 is of the type which may be characterized as the "bottomless" type. As this name implies, an open bottom portion 12 is presented between a pair of side or end plates 14, and secured to these side plates in the margins thereof is a substantially semi-cylindrical casing 16. The bottom portion of this casing 16 supports a runner or shoe 18 and also an earth engaging blade or plate 20 having a sharp earth engaging edge 22. This plate or blade 20 extends between the side plates 14, and secured to the bottom of each of the side plates 14 is a runner or shoe 24. This shoe 24 may be formed from suitable angle iron stock, the bottom flange thereof providing the runner 24 and the outer flange 24a, Figure 2, providing a guard for protecting the outer surface of the side plate to which it is secured. To further facilitate the rolling action of the bowl over the ground, I provide additional extensions or shoes 26 which are secured to and extend from the top portion of the casing 16.

The bottomless bowl or scraper 10 is provided with trunnions 28 which are mounted within the rear section of a draft frame 30. This draft frame 30 extends forwardly on opposite sides of the bowl and converges to provide a support for a hydraulic mechanism designated generally by the numeral 32. Extending upwardly from the frame 30 is an upright frame structure 34. A pin 36 supported by this upright frame structure, extends through an arcuate slot 38 formed in a plate 40 which is supported by a reciprocable actuator bar 42. The forward extremity of this actuator bar 42 is pivotally connected to one end of a piston rod 44, which forms a part of the hydraulic mechanism 32. The opposite or rearward extremity of the actuator bar 42 is equipped with a pivoted latch member 46, which is normally secured against counter-clockwise movement as viewed in Figures 1 and 2, by means of a trip lever 48. This lever 48 is constantly urged to the left through the action of a spring 50, Figure 1.

When the bowl 10 and the latch member 46 are positioned as shown in Figure 1, an abutment 52 carried by the casing 16 engages the latch member 46, thereby preventing the clockwise tilting of the bowl as the same is urged across the surface of the soil 54, in response to the pulling force of a tractor 56 suitably coupled with the draft frame 30. With the bowl 10 in this position, the blade 20 digs into the surface of the soil and causes said soil to be scooped into said bowl. This position of the bowl may be referred to as the cutting position because in this position a cut may be taken across the surface of the soil.

The bottomless type bowl 10 is particularly adaptable for use in connection with soil which is damp or which is of such a consistency that it will readily pack itself into the scraper or bowl as said scraper is being drawn across the ground. A bottomless type bowl may be used with such soil, because said soil will pack itself into the bowl and will not fall out until said bowl is completely inverted.

The hydraulic mechanism 32 includes a cylinder 58 which is mounted at opposite extremities upon the draft frame 30. The piston rod 44 connects with a suitable piston 60, which is reciprocable within the cylinder 58, and a flexible conduit 62 serves to connect one end of the cylinder with a source of fluid supply on the tractor 56. A suitable valve 64 adapted to be manually manipulated by means of a handle 66, serves to control the passage of fluid through the conduit 62. When the valve occupies the position shown in Figure 1, the fluid is locked within the conduit, thereby preventing movement of the piston 60 to the right. By shifting the valve downwardly to the right, fluid connection is established so as to cause the introduction of fluid within the cylinder 60, thereby effecting the shifting of the actuator bar to the left. When the handle 66 is shifted to a vertical position, fluid is free to flow in a reverse direction within the conduit 62, thereby permitting the shifting of the piston 60 to the right in response to the engagement of the abutment 52 with the latch 46 as the bowl is rolled across the surface of the soil.

Consider now that it is desired to shift the bowl from the cutting position shown in Figure 1 to the position shown in Figure 2. The handle 60 is shifted downwardly and to the right so as to establish connection between the source of fluid supply and the cylinder 58. This causes the actuator bar to be shifted to the left, thereby effecting a counter-clockwise movement of the bowl 10. During the initial movement of the bowl, said bowl experiences only a rotary movement, but during the latter portion of its movement said bowl is elevated as a result of the engagement of fingers 68 with abutments or lugs 70 which project inwardly from side plates 72. These side plates 72 are mounted upon rearwardly extending frame members 74. These frame members are pivotally connected to the trunnions 28 and at their rear extremities to opposite ends of a shaft 76, which carries trailer wheels 78. Upon the engagement of the fingers 68 with the lugs 70, a toggle action takes place, which causes the raising of the bowl 10, as clearly shown in Figure 2. The fingers 68 are pivotally mounted on the end plates 14 and are continuously urged into engagement with stops 80 through the agency of suitable springs 82. Thus when the fingers 68 engage the lugs 70, the stops 80 prevent the pivoting of said fingers. However, when the bowl is rotated across the surface of the soil in response to the pulling action of the tractor 56, these fingers will click past the abutments or lugs 70.

When it is desired to discharge the soil from the bowl, it is only necessary for the operator positioned on the tractor seat 84, to exert a pull to the right on a cord 86, Figure 1. This renders the latch member 46 functionally inoperative and the bowl is free to roll across the surface of the ground. In so doing, the soil within the bowl is discharged therefrom, and as said bowl reaches the position shown in Figure 1, the abutment 52 engages the latch 46 so as to position said bowl as shown in Figure 1, to again make a cut within the soil. In other words, the position of the cutting edge of the bowl may be very conveniently and accurately controlled by merely manipulating the single control handle 66 conveniently positioned with respect to the operator's seat 84.

Certain of the structural features of the above described mechanism are similar to those disclosed in my co-pending application, Serial No. 449,911, filed May 5, 1930, but my present application covers improvements not shown in said co-pending application. Attention is directed to the fact that I propose to incline the actuating member 42, as well as the piston rod 44 connected therewith. This arrangement provides a very effective bowl shifting structure and also presents a very practical and rigid construction. The arcuate way 38 provided in the plate 40 serves to cause the latch member 46 to move in an arcuate path in conformity with the arcuate surface of the bowl structure. This specific arcuate way arrangement is also shown in my above mentioned co-pending application, and therefore a detailed description of its functional characteristics is not essential to a clear understanding of the present invention.

From the foregoing it will be apparent that my invention provides a very efficiently operable earth carrying means. By having the trailer wheels 78 positioned as shown, said wheels will always travel within the wake made by the bowl, and will never be positioned outside of said wake. This renders the device very practical in instances where it is not possible to position such wheels outside of the plane of the bowl ends. For example, if the scraper or bowl is being used in road work and it is desired to work close to the shoulder of the road, the positioning of the trailer wheels 78 inside of the plane of the bowl ends greatly facilitates the practical functioning thereof. Likewise, in instances where it is desired to cut close to a wall or other abutment, the trailer wheels are so positioned as not to interfere in any way with the functioning of the scraper.

My invention is not limited to the bottomless type bowl structure as shown in Figures 1 to 3 inclusive, but may also be employed in connection with the bowl structure shown in Figure 4. The bowl in this figure has been designated by the numeral 10a, and it will be noted that this bowl is not provided with the open bottom as described in connection with the bowl 10. In place of the open bottom portion 12, this bowl 10a includes the usual earth receiving plate 88 which is supported by the bowl casing. In other words, my invention contemplates the use of my improved trailer construction and pivoted fingers for effecting the elevation of the bowl in combination with various types of bowl structures.

As stated above, my invention is not limited to the bottomless type bowl structure, but contemplates the bowl structure shown in Figure 4, wherein the plate 88 is provided, and this plate is formed with a downwardly deflected cutting edge portion at the outer end thereof. By having the plate downwardly deflected in this manner, the cutting action of the scraper or bowl, as it is drawn across the surface of the ground, is greatly facilitated. By having this downwardly deflected portion, the cutting edge more effectively digs downwardly into the soil, and the weight of the bowl structure and associated parts cooperates therewith in forcing the cutting edge into the soil. This should be distinguished from the flat type blade. In the bottomless bowl structure shown in Figures 1 to 3 inclusive the deflected blade is not required in view of the fact that the forward portion of the blade 20 projects beyond the normal resting position of the bowl, as shown in Figure 1, and hence occupies an angularly disposed position with respect to the surface of the soil when the bowl assumes a cutting position.

Having thus described my invention, what I claim as new and desire to secure by Letters Patent is:

1. In an earth moving device adapted to be moved across the surface of the ground, a support, a roll-over type earth carrying means having a material receiving edge, said means being mounted on said support and including a curved casing having an open bottom, latch means for securing the rotary earth carrying means in various positions of adjustment, a trailer coupled with said earth carrying means, and hydraulically operable means for controlling the position of said latch means.

2. In an earth moving device adapted to be moved across the surface of the ground, a support, a rotary earth carrying means having a material receiving edge, said means being mounted on said support and including a curved casing having an open bottom, hydraulically operable means including a latch mechanism for adjustably controlling the position of the material receiving edge with respect to the surface of the ground, a trailer coupled with said earth carrying means, and runners provided on said earth carrying means along each side of the open bottom portion.

3. In an earth moving device adapted to be moved across the surface of the ground, a tiltable earth receiving means having a material receiving edge and having an abutment shiftable along a substantially circular path in response to the tilting of said earth receiving means, means for pivotally supporting said earth receiving means, a shiftable actuating member adapted to operatively engage said earth receiving means, said member being inclined with respect to the plane of said support and adapted to engage the abutment on said earth receiving means, and a hydraulic actuator including a casing, a piston shiftable within said casing and a piston rod connected with said piston, the axis of said cylinder and piston being inclined in conformity with the inclination of said actuating member, said piston rod being connected with said actuating member for imparting movement thereto.

4. In an earth moving device of the class described, a tiltable earth receiving means having a material receiving edge and including a substantially semi-cylindrical casing, an abutment movable with said casing, a draft frame for pivotally supporting said earth receiving means, said draft frame being adapted for connection with a suitable tractive device, a hydraulic actuator mechanism supported by said draft frame, said mechanism including a cylinder and a piston reciprocable therein, the axis of said cylinder and piston being inclined with respect to said frame, and an elongated actuating member connected with said hydraulic mechanism and inclined with respect to said draft frame, said actuating member being adapted to engage the abutment associated with the casing for effecting the shifting of said earth receiving means.

5. In an earth moving device of the class described, a tiltable earth receiving means having a material receiving edge and including a substantially semi-cylindrical device, an abutment movable with said casing, a draft frame for pivotally supporting said earth receiving means, said draft frame being adapted for connection with a suitable tractive device, a hydraulic actuator mechanism supported by said draft frame, said mechanism including a cylinder and a piston reciprocable therein, the axis of said cylinder and piston being inclined with respect to said frame, an elongated actuating member connected with said hydraulic mechanism and inclined with respect to said draft frame, said actuating member being adapted to engage the abutment associated with the casing for effecting the shifting of said earth receiving means, and manually operable means for selectively controlling the actuation of said hydraulic mechanism, whereby to selectively control the position of the material receiving edge of said earth receiving means.

6. In an earth moving device of the class described adapted to be drawn across the surface of the ground, a tiltable earth receiving bowl having a material receiving edge, a frame pivotally supporting said earth receiving means, a shiftable actuating member adapted to vary the position of said material receiving edge, rotary trailer means connected with said frame, an abutment spaced from the axis of said trailer means, and means movable with said earth receiving bowl for engaging said abutment in response to the tilting of the bowl to effect the elevation thereof.

7. In an earth moving device of the class described adapted to be drawn across the surface of the ground, a tiltable earth receiving bowl having a material receiving edge, a frame pivotally supporting said earth receiving means, a shiftable actuating member adapted to vary the position of said material receiving edge, trailer means including a rotary element and means connecting said rotary element with said frame, said rotary element being positioned between planes including the opposite sides of said bowl, whereby to effect the travel of said rotary element within the wake of said bowl, and means movable with said earth receiving bowl for engaging the structure of said trailer means in response to the tilting of the bowl to effect the elevation thereof.

8. In an earth moving device of the class described adapted to be drawn across the surface of the ground, a tiltable earth receiving bowl having a material receiving edge, a frame pivotally supporting said earth receiving means, a shiftable actuating member adapted to vary the position of said material receiving edge, rotary trailer means connected with said frame, and means carried by said bowl in a position free from and to one side of the periphery thereof for engaging the structure of said trailer means in response to the tilting of the bowl to effect the elevation thereof.

9. In an earth moving device of the class described adapted to be drawn across the surface of the ground, a tiltable earth receiving bowl having a material receiving edge, a frame pivotally supporting said earth receiving means, a shiftable actuating member adapted to vary the position of said material receiving edge, rotary trailer means connected with said frame, a finger pivotally supported by the bowl in a position free from and to one side of the periphery thereof, a stop for securing said finger against rotation in a given direction, and resilient means for urging said finger against said stop, said finger being adapted in response to the tilting of the bowl to engage the structure of said trailer means for effecting the elevation of said bowl.

10. In an earth moving device of the class described adapted to be drawn across the surface of the ground, a tiltable earth receiving bowl having a material receiving edge, a frame for tiltably supporting said bowl, means for selectively tilting said bowl to vary the position of the material receiving edge thereof with respect to the surface of the ground, a frame extending rearwardly from and pivotally supported on opposite sides of said bowl, rotary tractive means supported between said rearwardly extending frames, the sides of said rotary means lying inside of the planes including the opposite ends of said bowl, whereby to cause the same to move within the wake of said bowl, and means movable with said bowl for engaging the structure of said rearwardly extending frames in response to the tilting of the bowl whereby to effect the elevation thereof.

RAYMOND L. HARRISON.